United States Patent
Tushinskiy

(10) Patent No.: US 11,545,138 B1
(45) Date of Patent: Jan. 3, 2023

(54) VOICE REVIEW ANALYSIS

(71) Applicant: INSTREAMATIC, INC., Palo Alto, CA (US)

(72) Inventor: Stanislav Tushinskiy, Mountain View, CA (US)

(73) Assignee: INSTREAMATIC, INC., Palo Alto, CA (US)

( * ) Notice: Subject to any disclaimer, the term of this patent is extended or adjusted under 35 U.S.C. 154(b) by 0 days.

(21) Appl. No.: 17/691,196

(22) Filed: Mar. 10, 2022

Related U.S. Application Data

(63) Continuation-in-part of application No. 17/467,487, filed on Sep. 7, 2021, now Pat. No. 11,301,883.

(51) Int. Cl.
- *G06Q 30/02* (2012.01)
- *G10L 15/08* (2006.01)
- *G10L 15/18* (2013.01)
- *G10L 15/26* (2006.01)

(52) U.S. Cl.
CPC ........ *G10L 15/083* (2013.01); *G06Q 30/0203* (2013.01); *G10L 15/1815* (2013.01); *G10L 15/1822* (2013.01); *G10L 15/26* (2013.01); *G06Q 30/0201* (2013.01); *G06Q 30/0245* (2013.01); *G10L 2015/088* (2013.01)

(58) Field of Classification Search
CPC .......... G06Q 30/0203; G06Q 30/0201; G06Q 30/0245
See application file for complete search history.

(56) References Cited

U.S. PATENT DOCUMENTS

| | | | |
|---|---|---|---|
| 7,383,200 B1* | 6/2008 | Walker | G06Q 10/06398 705/7.29 |
| 11,250,857 B1* | 2/2022 | Kim | G10L 15/22 |
| 2009/0306981 A1* | 12/2009 | Cromack | G06F 16/685 707/E17.103 |
| 2013/0346867 A1* | 12/2013 | Woods | G11B 27/34 715/728 |
| 2014/0230053 A1* | 8/2014 | Mote | H04L 63/12 726/22 |
| 2015/0161513 A1* | 6/2015 | Li | G06N 5/04 706/11 |

(Continued)

OTHER PUBLICATIONS

"A machine learning approach to product review disambiguation based on function, form and behavior classification" (Singh et al. published on Mar. 20, 2017 at www.elsevier.com in the "Decision Support Systems" Elsevier Journal) (Year: 2017).*

*Primary Examiner* — James M Detweiler
(74) *Attorney, Agent, or Firm* — Georgiy L. Khayet

(57) ABSTRACT

Systems and methods for Artificial Intelligence (AI)-based analysis of oral reviews are provided. An example method includes prompting a user to provide an oral review concerning a subject; providing the user with an interface configured to receive the oral review; receiving, via the interface, the oral review concerning the subject in a free format; generating, based on the oral review, a text for review and presenting the text for review to the user; and providing, to the user, an option to publish the text for review via at least one social media. Generating the text for review may include removing filler words from the oral review and converting the oral review from the free format to a format according to a grammar rule of at least one human language.

18 Claims, 10 Drawing Sheets

(56) References Cited

U.S. PATENT DOCUMENTS

| | | | |
|---|---|---|---|
| 2016/0180360 A1* | 6/2016 | Tietzen | G06Q 30/0203 |
| | | | 705/7.32 |
| 2017/0004517 A1* | 1/2017 | Jaggi | G06Q 30/0203 |
| 2017/0032426 A1* | 2/2017 | Salvato | H04L 51/52 |
| 2019/0206408 A1* | 7/2019 | Qi | G10L 15/22 |
| 2019/0371303 A1* | 12/2019 | Siva Kumaran | G06N 20/00 |
| 2020/0294068 A1* | 9/2020 | Montoya | G06Q 30/0215 |
| 2020/0327585 A1* | 10/2020 | Boyce | G06F 16/9536 |

* cited by examiner

500

```
┌─────────────────────────────────────────────────────────┐
│  Prompt a user to provide an oral review concerning a   │
│                         subject                          │
│                          505                             │
└─────────────────────────────────────────────────────────┘
                            │
                            ▼
┌─────────────────────────────────────────────────────────┐
│  Provide the user with an interface configured to       │
│                 receive the oral review                  │
│                          510                             │
└─────────────────────────────────────────────────────────┘
                            │
                            ▼
┌─────────────────────────────────────────────────────────┐
│  Receive, via the interface, the oral review concerning │
│              the subject in a free format                │
│                          515                             │
└─────────────────────────────────────────────────────────┘
                            │
                            ▼
┌─────────────────────────────────────────────────────────┐
│  Analyze the oral review with the AI to determine key   │
│            parameters associated with the subject        │
│                          520                             │
└─────────────────────────────────────────────────────────┘
                            │
                            ▼
┌─────────────────────────────────────────────────────────┐
│  Based on the key parameters, generate a structured     │
│             review report concerning the subject         │
│                          525                             │
└─────────────────────────────────────────────────────────┘
```

*FIG. 5*

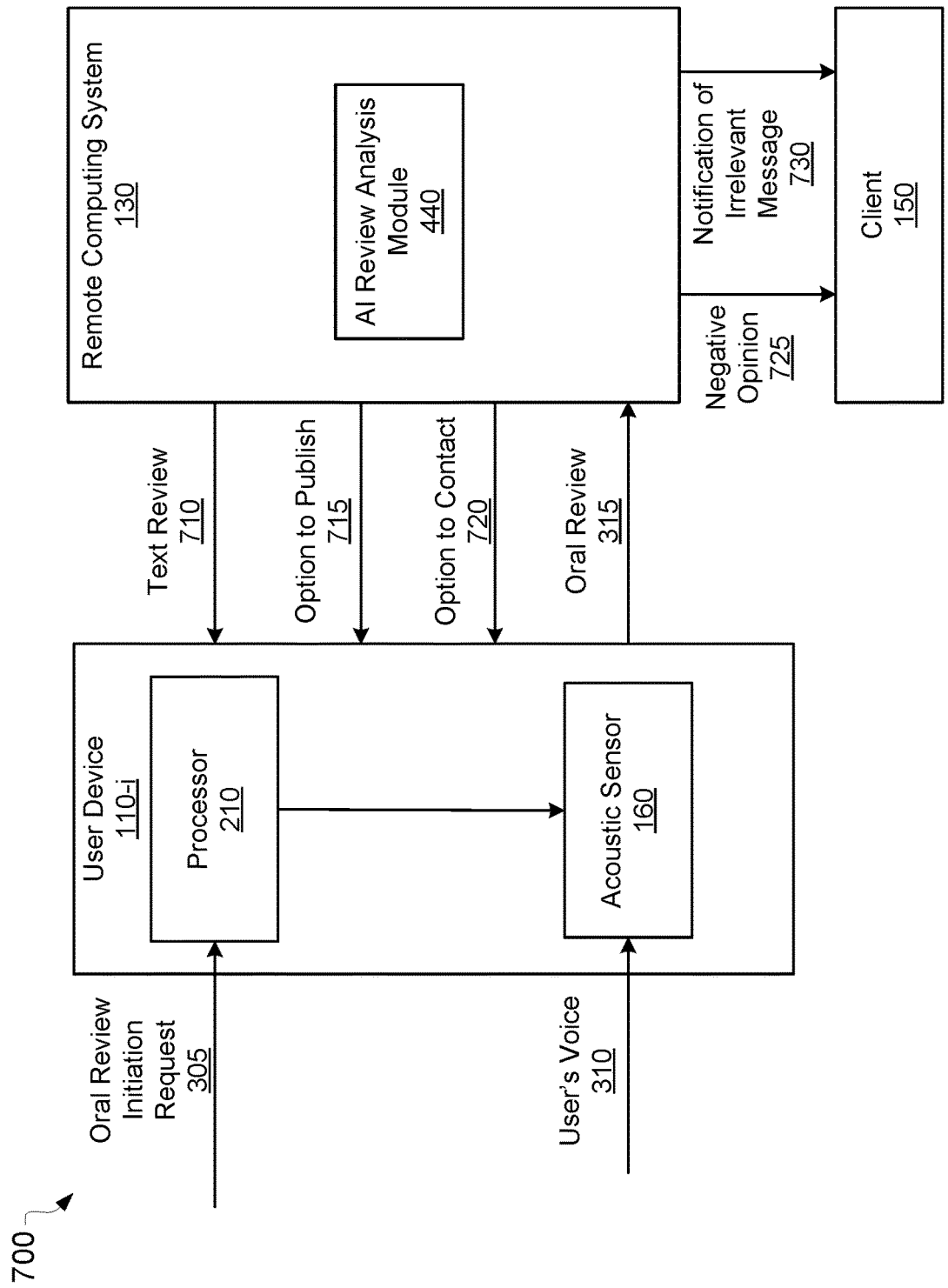

800

```
┌─────────────────────────────────────────────────────────┐
│  Prompt a user to provide an oral review concerning     │
│  a subject                                              │
│                         805                             │
└─────────────────────────────────────────────────────────┘
                             │
                             ▼
┌─────────────────────────────────────────────────────────┐
│  Provide the user with an interface configured to       │
│  receive the oral review                                │
│                         810                             │
└─────────────────────────────────────────────────────────┘
                             │
                             ▼
┌─────────────────────────────────────────────────────────┐
│  Receive, via the interface, the oral review concerning │
│  the subject in a free format                           │
│                         815                             │
└─────────────────────────────────────────────────────────┘
                             │
                             ▼
┌─────────────────────────────────────────────────────────┐
│  Generate, based on the oral review, a text review      │
│                         820                             │
└─────────────────────────────────────────────────────────┘
                             │
                             ▼
┌─────────────────────────────────────────────────────────┐
│  Present the text review to the user                    │
│                         825                             │
└─────────────────────────────────────────────────────────┘
                             │
                             ▼
┌─────────────────────────────────────────────────────────┐
│  Provide, to the user, an option to publish the text    │
│  review via at least one social media                   │
│                         830                             │
└─────────────────────────────────────────────────────────┘
```

Analyze the oral review with the AI to determine that the user has expressed a negative opinion regarding the subject
905

In response to the determination, send a report concerning the negative opinion to a service provider or a product provider
910

Present information allowing the user to contact the service provider or the product provider
915

Analyze the oral review with the AI to determine that the oral review includes an irrelevant message
1005

In response to the determination, notify a service provider or a product provider of the irrelevant message
1010

*FIG. 10*

VOICE REVIEW ANALYSIS

CROSS REFERENCE TO RELATED APPLICATIONS

This application is a Continuation-in-Part of, and claims the priority benefit of, U.S. patent application Ser. No. 17/467,487, filed on Sep. 7, 2021, and entitled "Voice Survey Collection and Analysis." The subject matter of the aforementioned application is incorporated herein by reference in its entirety.

TECHNICAL FIELD

This disclosure generally relates to the field of review collection and analysis. Specifically, this disclosure relates to systems and methods for analyzing voice reviews.

BACKGROUND

Questionnaires are one of the tools used by service providers to receive customer feedback with regard to the services they provide. Conventional review collection systems typically ask users to fill out questionnaires that can include multiple pages of questions. Some questions may relate to the subject of the review, e.g., a service, while other questions may ask users to rate the service on a scale of one to ten. Still other questions may ask users to provide their opinion in a free form. However, users may find it too time-consuming to go through multiple page documents, answer multiple questions, and provide written opinions. Moreover, some users may not have or want to spend time on writing a free format review.

SUMMARY

This section introduces a selection of concepts in a simplified form that are further described in the Detailed Description section, below. This summary does not identify key or essential features of the claimed subject matter and is not intended to be an aid in determining the scope of the claimed subject matter.

The present disclosure is directed to systems and methods for Artificial Intelligence (AI)-based analysis of oral reviews. According to an example embodiment, a system for AI-based analysis of oral reviews is provided. The system may include a processor and a memory in communication with the processor. The processor may be communicatively coupled to a user device of a user and a remote computing system. The processor may be configured to prompt a user to provide, via the user device, an oral review concerning a subject. The processor may be further configured to provide, via the user device, the user with an interface configured to receive the oral review. The processor may be further configured to receive, via the interface, the oral review concerning the subject in a free format. The processor may provide the oral review to the remote computing system. The remote computing system may be configured to generate, based on the oral review, a text for review and present, via the user device, the text for review to the user. The processor may be further configured to provide, to the user, an option to publish the text for review via at least one social media.

According to another example embodiment, a method for AI-based analysis of oral reviews is provided. The method may commence with prompting a user to provide an oral review concerning a subject. The method may include providing the user with an interface configured to receive the oral review. The method may further include receiving, via the interface, the oral review concerning the subject in a free format. The method may continue with generating, based on the oral review, a text for review and presenting the text for review to the user. The method may further include providing, to the user, an option to publish the text for review via at least one social media.

According to another example embodiment, provided is a non-transitory computer-readable storage medium having instructions stored thereon, which when executed by one or more processors, cause the one or more processors to perform steps of the method for AI-based analysis of oral reviews.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements.

FIG. 5 is a flow chart showing a method for AI-based analysis of oral reviews, according to an example embodiment.

FIG. 7 is a block diagram illustrating an example communication between a user device and a remote computing system for analyzing oral reviews, according to an example embodiment.

FIG. 8 is a flow chart showing a method for AI-based analysis of oral reviews, according to an example embodiment.

FIG. 9 is a flow chart showing a method for AI-based analysis of oral reviews, according to an example embodiment.

FIG. 10 is a flow chart showing a method for AI-based analysis of oral reviews, according to an example embodiment.

DETAILED DESCRIPTION

Figure 1:
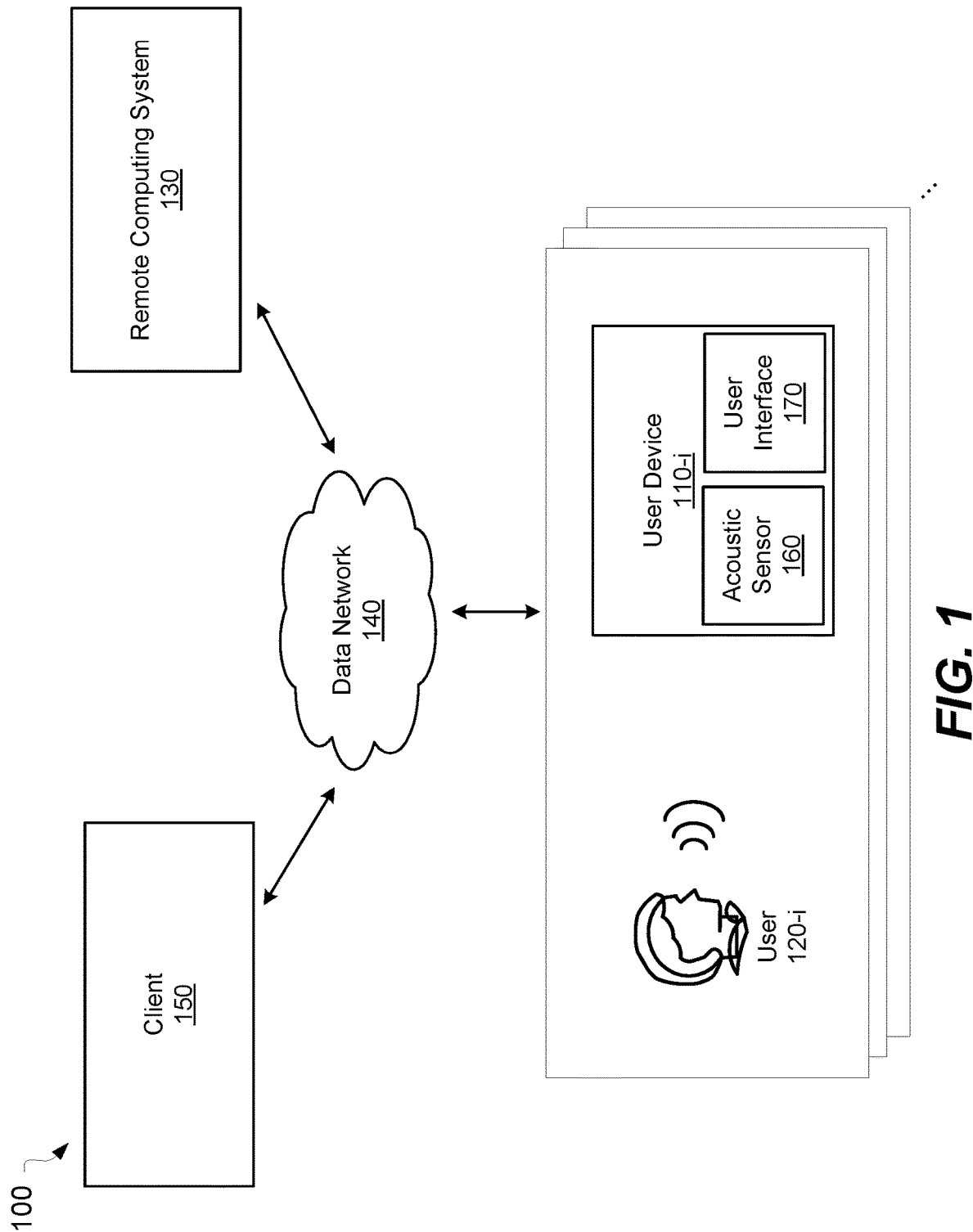
FIG. 1 is a block diagram showing an example environment, in which a system and a method for AI-based analysis of oral reviews can be implemented, according to an example embodiment.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

The technology described herein is concerned with systems and methods for AI-based analysis of oral reviews. According to an example embodiment of the present disclosure, a system for AI-based analysis of oral reviews is provided. The system may be associated with user devices of a plurality of users and may include a remote AI-based computing system.

The system may use a user device to prompt a user to provide an oral review (also referred to herein as voice reviews) concerning a subject. For example, the prompt may be provided in a form of a link in an e-mail or text message, in a Quick Response (QR) code, in an advertising message provided in a video or audio content to the user, and so forth. The user may select the link to initiate the oral review. In response to the selection of the link, the system may provide, via the user device, a user interface configured to receive the oral review. Upon determining that the user has accessed the user interface, an acoustic sensor (e.g., a microphone) of the user device may be activated. The user interface may prompt the user to provide the oral review concerning the subject in a free format. In an example embodiment, the user interface may display a record button. The user may click on the record button and talk about the subject (i.e., provide user feedback in a free format) for a predetermined time. After the user presses the record button, the user device may record the ambient acoustic signal of the oral review. In the oral review, the user may describe their experience of interacting with the subject, advantages and disadvantages of the subject, and provide any other information the user finds relevant with respect to the subject.

In another example embodiment, upon determining that the user has entered the user interface, a processor of the user device may monitor, via the acoustic sensor, an ambient acoustic signal to detect the presence of the voice of the user. If the voice is detected, the processor may record, via the acoustic sensor, the ambient acoustic signal for a predetermined time to obtain the oral review in a free format.

Upon recording the ambient acoustic signal, the user device may provide the ambient acoustic signal containing the oral review to a remote computing system. The remote computing system may analyze the oral review using the AI. Specifically, the remote computing system may perform speech recognition of the recorded ambient acoustic signal to obtain a text response and analyze the text response. The remote computing system may further analyze the tone, speed, volume of the user voice, and emotional state of the user. The remote computing system may further determine user-related information based on the oral review and other data associated with the user device. The user-related information may include a gender, location, age, and so forth.

Based on the analysis, the remote computing system may determine key parameters associated with the subject. The key parameters may be determined by parsing the oral review, determining keywords in the oral review, and analyzing the keywords to determine which keywords are key parameters of the subject specifically rated or mentioned by the user. Based on the key parameters, the remote computing system may generate a structured review report concerning the subject. The structured review report may be provided to a client that requested to conduct the oral review. The structured review report may be provided in a form of a completed questionnaire summarizing the information provided by the user.

In an example embodiment, the system may prompt multiple users to provide oral reviews. The system may analyze the oral reviews received in the form of voice answers from the users. Based on the analysis, the system may determine common parameters of the subject mentioned by multiple users in the oral reviews. The system may then analyze the common parameters and generate an aggregated review report based on an analysis of the oral reviews received from multiple users. The system may provide the aggregated review report to the client. The aggregated review report may include analytical and statistical data associated with responses of the multiple users and may include graphs, diagrams, spreadsheets, and so forth.

Thus, in contrast to conventional review forms that include multiple pages or a long webpage of fixed questions (such as "What is your name/gender/age?", "Where do you live?", "Rate from one to ten"), the system of the present disclosure enables users to provide oral responses to a review in a free format without the need for the user to answer specific questions. The user can provide responses to the oral review by talking during a predetermined time interval about the subject of the review and provide information that the user considers relevant to the subject of the review.

Moreover, in contrast to conventional reviews, the system of the present disclosure does not require the user to respond to a list of predetermined questions. Instead, key parameters that appeared to be relevant to the subject or important to the user are determined by the system automatically using the AI based on the analysis of the oral review. In other words, the AI can be configured to understand what information (i.e., key parameters) users want to highlight in oral reviews.

Furthermore, a client that requested to conduct a review may receive the review results in the form of a structured, ready-made, and completed questionnaire. The AI can be configured to determine, based on the analysis of the oral reviews, which parameters of the subject should be included in the completed questionnaire presented to the client. The key parameters of aggregated multiple oral reviews can be scored such that the client receives a completed questionnaire with the key parameters of the subject aggregated and scored.

The AI, as used herein, refers to software techniques that analyze problems similar to human thought processes, or at least mimic the results of such thought processes, through the use of software for machine cognition, machine learning algorithmic development, and related programming techniques. Thus, in the context of the present disclosure, AI refers to the algorithmic improvements over original algorithms by application of such software, particularly with the use of data collected in the processes disclosed in this application.

Referring now to the drawings, FIG. 1 shows an example environment 100, in which a system and a method for AI-based analysis of oral reviews can be implemented. The environment 100 may include one or more user devices 110-*i*, users 120-*i*, (i=1, . . . , N) associated with the user devices 110-*i*, a remote computing system 130, a client 150, and a data network 140.

The user device 110-*i* may include, but is not limited to, a laptop computer, a desktop computer, a tablet computer, a phablet, a smart phone, a personal digital assistant, a media player, a mobile telephone, a smart television (TV) set, an in-vehicle infotainment system, a smart home device, and the like. An example user device 110-*i* is described in detail in FIG. 2. Each of the user devices 110-*i* (i=1, . . . , N) can include transmitters, transceivers, wired and/or wireless telecommunications and/or networking devices, amplifiers, audio and/or video players, encoders, decoders, speakers, inputs, outputs, storage devices, user input devices, and the like. The user device 110-*i* can be configured to communicate with the remote computing system 130.

The client 150 may request that the remote computing system 130 conduct a review on a subject. For the subject, which may include products or services, the client may provide a manufacturer of the products, a provider of the services, a marketer, or any other entity. The subject of the review may be related to a product associated with the manufacturer of the product, a service associated with a provider of the service, and the like. The request to conduct the review may include information related to the subject, one or more questions related to the subject, and any other data.

The user device 110-*i* can be configured to receive data and provide the data to the user 120-*i*. The data may include a website content, a broadcast, including a television, an Internet radio, an Internet television, a video stream provided via social media, a podcast, and so forth. The data may also include data stored locally in memory of the user device 110-*i* or remotely in storage associated with the remote computing system 130. The data may include video content, audio content, text, images, and so forth.

In the course of receiving the data mentioned above, the user device 110-*i* may receive a prompt to provide an oral review concerning a subject. For example, the prompt may include a notification provided via a link, a text message, a QR code printed on a product, a record button, a voice prompt, and so forth. The prompt may be provided via an e-mail, on a website, in a text message received via a small message service or messengers, as part of an advertising message, as part of a message shown during consuming a video or audio stream by the user device 110-*i* (e.g., when the user watches TV or listens to the music using the user device 110-*i*). In further embodiments, a QR code and an invitation to provide an oral review may be provided on any product at any location. The user 120-*i* may scan the QR code using a camera of the user device 110-*i*. Upon scanning the QR code, the user device 110-*i* can open a link encoded in the QR code.

In an example embodiment, the prompt may further include a question to which the user 120-*i* is asked to respond in the oral query. Example questions may include "How old is your car?," "What do you think about this food?," "Do you like your new iPhone?," feedback-related questions such as "You stayed at our hotel, what do you think about it?," and so forth.

If the user 120-*i* agrees to provide the oral review, the user 120-*i* may click the link, open the message, or scan the QR code or otherwise respond to the prompt using the user device 110-*i*. The user device 110-*i* may determine that the user 120-*i* has responded to the prompt (e.g., opened a link) and, based on the determination, provide an interface (shown as a user interface 170) to the user device 110-*i* and open the interface. The interface may be configured to receive the oral review from the remote computing system 130.

In an example embodiment, the user interface 170 may prompt the user 120-*i* to provide the oral review concerning the subject in a free format. For example, the user interface 170 may present a record button on a screen of the user device 110-*i*. The user 120-*i* may click on the record button and speak about the subject for a predetermined time. The user device 110-*i* may record an ambient acoustic signal after the user 120-*i* presses the record button.

In another example embodiment, the processor of the user device 110-*i* cam determine that the user 120-*i* has entered the user interface 170 (for example, the user 120-*i* has clicked on a link within a message). Based on the determination that the user 120-*i* has entered the user interface 170, the processor may monitor, via an acoustic sensor 160, an ambient acoustic signal to detect the presence of the voice of the user 120-*i*. If the voice is detected, the processor may record, via the acoustic sensor 160, the ambient acoustic signal for a predetermined time to obtain the oral review in a free format.

In some embodiments, the user device 110-*i* may receive the data using the data network 140. The data network 140 can refer to any wired, wireless, or optical networks including, for example, the Internet, intranet, local area network (LAN), Personal Area Network (PAN), Wide Area Network (WAN), Virtual Private Network (VPN), cellular phone networks (e.g., Global System for Mobile (GSM) communications network), Wi-Fi™ network, packet switching communications network, circuit switching communications network), Bluetooth™ radio, Ethernet network, an IEEE 802.11-based radio frequency network, a Frame Relay network, Internet Protocol (IP) communications network, or any other data communication network utilizing physical layers, link layer capability, or network layer to carry data packets, or any combinations of the above-listed data networks. In some embodiments, the data network 140 includes a corporate network, data center network, service provider network, mobile operator network, or any combinations thereof.

In some embodiments, the remote computing system 130 may be implemented as a server(s) or a cloud-based computing resource(s) shared by multiple users. The remote computing system 130 can include hardware and software available at a remote location and accessible over the data network 140. The remote computing system 130 can be dynamically re-allocated based on demand. The cloud-based computing resources may include one or more server farms/clusters including a collection of computer servers, which can be co-located with network switches and/or routers.

In some embodiments, the user device 110-*i* can record, via the acoustic sensor 160, the oral review concerning the subject from the user 120-*i* and send the oral review in form of audio data to the remote computing system 130. The remote computing system 130 can be configured to receive oral reviews of users 120-*i* over the data network 140 and perform speech recognition of the oral reviews in the form of audio data to obtain the oral reviews of the users 120-*i* in the form of text. The remote computing system 130 can be configured to analyze the oral reviews to determine analytical and statistical data associated with the oral reviews and provide the analytical and statistical data to the client 150.

Specifically, the remote computing system 130 can be configured to analyze the oral review with the AI, through machine learning techniques, to determine key parameters associated with the subject. The key parameters may include characteristics of the product characterized by the user 120-*i* in the oral review. The key parameters may be determined by parsing the oral review, determining keywords in the oral review, and analyzing the keywords to determine which keywords are key parameters of the subject rated or mentioned by the user 120-*i*. For example, the oral review may be requested by a hotel in which the user 120-*i* stayed recently and may include a prompt "Hi John! We were so glad to see you in our hotel, we would like to receive your feedback. Please tell us what you think about our hotel." The user 120-*i* may provide his feedback in a free format (i.e., by telling everything and in any form the user 120-*i* wants) by speaking for a predetermined time. The oral review of the user 120-*i* may be, for example, as follows: "In general, staying in the hotel was not bad. Breakfast was disappointing, but the bed was comfortable, people were noisy, but it's all right, my wife and I had a good time."

In certain embodiments, the remote computing system 130 can be configured to analyze characteristics of the audio data, such as a tone of voice, volume of voice, speed of voice, background noise, and so forth. The characteristics determined based on the oral review may be used to determine which words the user 120-*i* emphasizes, an emotional state of the user 120-*i* (in order to determine whether the feedback of the user 120-*i* is positive or negative), and other parameters.

The key parameters determined by the remote computing system 130 using an AI review analysis module of the system in this oral review may include: "breakfast," "disappointing," "bed," "comfortable," "people," "noisy," and "had a good time." The AI review analysis module may further determine a correlation between the key parameters, e.g., "breakfast"—"disappointing," "bed"—"comfortable," "people"—"noisy", and "overall evaluation"—"good."

Based on the key parameters, the remote computing system may generate a structured review report concerning the subject. The structured review report can be provided to a client that requested to conduct the review. The structured review report may be provided in a form of a completed questionnaire summarizing the information provided by the user 120-*i*.

Figure 2:
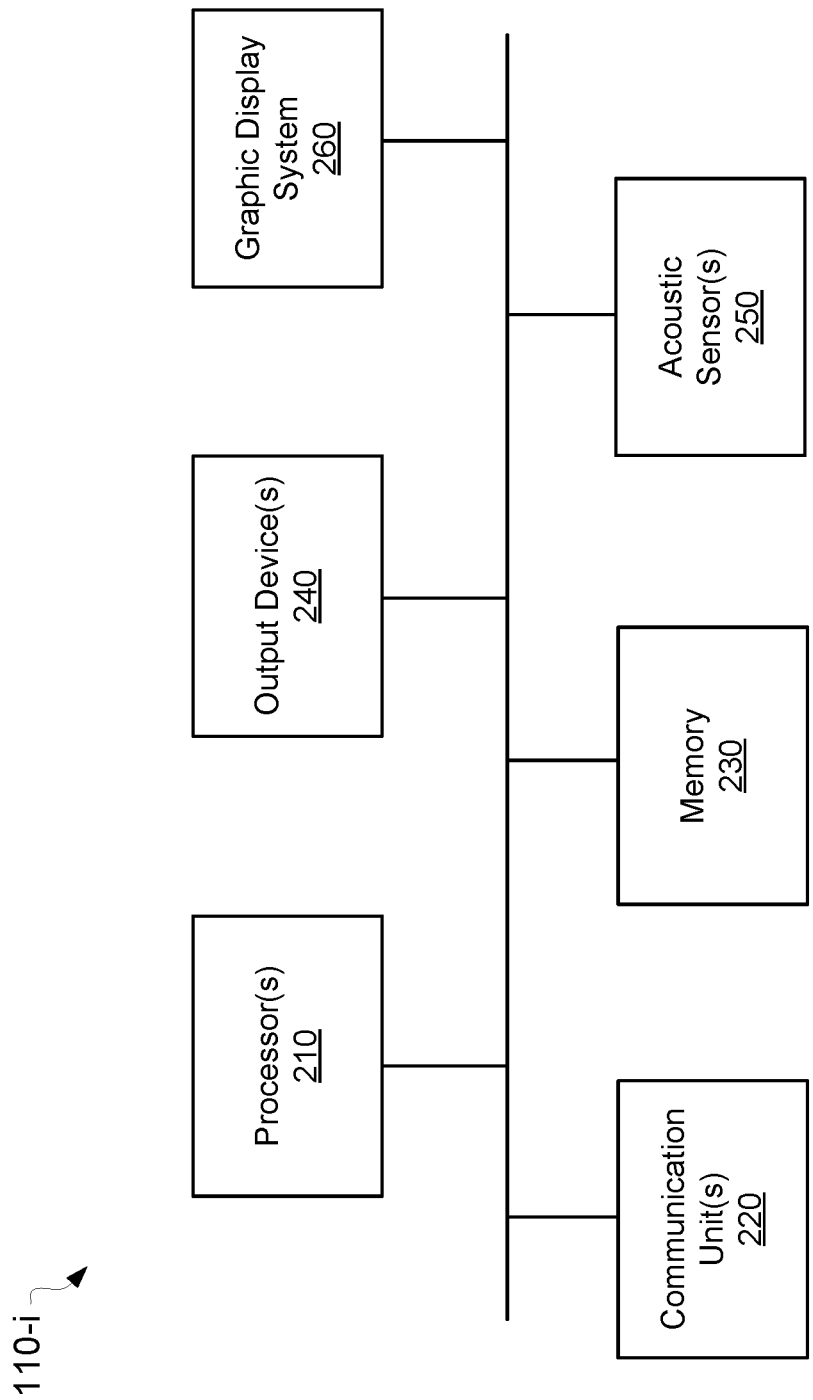
FIG. 2 is a block diagram showing a user device for collecting oral reviews, according to an example embodiment.

FIG. 2 is a block diagram showing a user device 110-*i* for collecting voice reviews, according to an example embodiment. FIG. 2 provides details of the user device 110-*i* of FIG. 1. In the illustrated embodiment, the user device 110-*i* may include one or more processor(s) 210, one or more communication unit(s) 220, a memory 230, one or more output device(s) 240, one or more acoustic sensor(s) 250, and a graphic display system 260. In other embodiments, the user device 110-*i* includes additional or other components necessary for operations of user device 110-*i*. Similarly, in certain embodiments, the user device 110-*i* includes fewer components that perform functions similar or equivalent to those depicted in FIG. 2.

In various embodiments, the processor(s) 210 include hardware and/or software, which is operable to execute instructions stored in the memory 230. The processor(s) 210 may perform floating point operations, complex operations, and other operations, including analyzing ambient acoustic signals to detect words spoken by users. The processor(s) 210 may include general purpose processors, video processors, audio processing systems, and so forth.

In various embodiments, the communication unit(s) 220 can be configured to communicate with a network such as the Internet, WAN, LAN, cellular network, and so forth, to receive audio and/or video data of media streams. The received audio and/or video data may then be forwarded to the processor(s) 210 and the output device(s) 240. The processors 210 may be configured to monitor, via the acoustic sensor(s) 250, an ambient acoustic signal to detect a presence of the voice of a user.

The acoustic sensor(s) 250 can include one or more microphones. The processors 210 can be configured to receive acoustic signals from an acoustic source, for example the user 120-*i*, via acoustic sensor(s) 250. Specifically, if the voice is detected in the ambient acoustic signal, the processor(s) 210 may record, via the acoustic sensor(s) 250, the ambient acoustic signal for a predetermined time to obtain the oral review in a free format.

The processor(s) 210 may be configured to send the recorded oral review to a remote computing system 130 shown in FIG. 1 for processing. In some example embodiments, the processing can be performed at least partially on a side of the user device 110-*i*. Specifically, the processor(s) 210 may be configured to process the acoustic signal to determine presence of keywords in the voice of the user 120-*i* and determine other characteristics of the voice, such as a tone, speed, emotional state, and so forth. The acoustic sensor(s) 250 can be spaced a distance apart to allow the processor(s) 210 to perform a noise and/or echo reduction in received acoustic signals.

In some embodiments, the output device(s) 240 may include any device which provides an audio output to a listener (for example, the user 120-*i*). The output device(s) 240 may include one or more speaker(s), an earpiece of a headset, a handset, and the like.

In various embodiments, the graphic display system 260 can be configured to provide a graphic user interface, also referred to herein a user interface or an interface. In some embodiments, a touch screen associated with the graphic display system 260 can be utilized to receive an input from a user.

Figure 3:
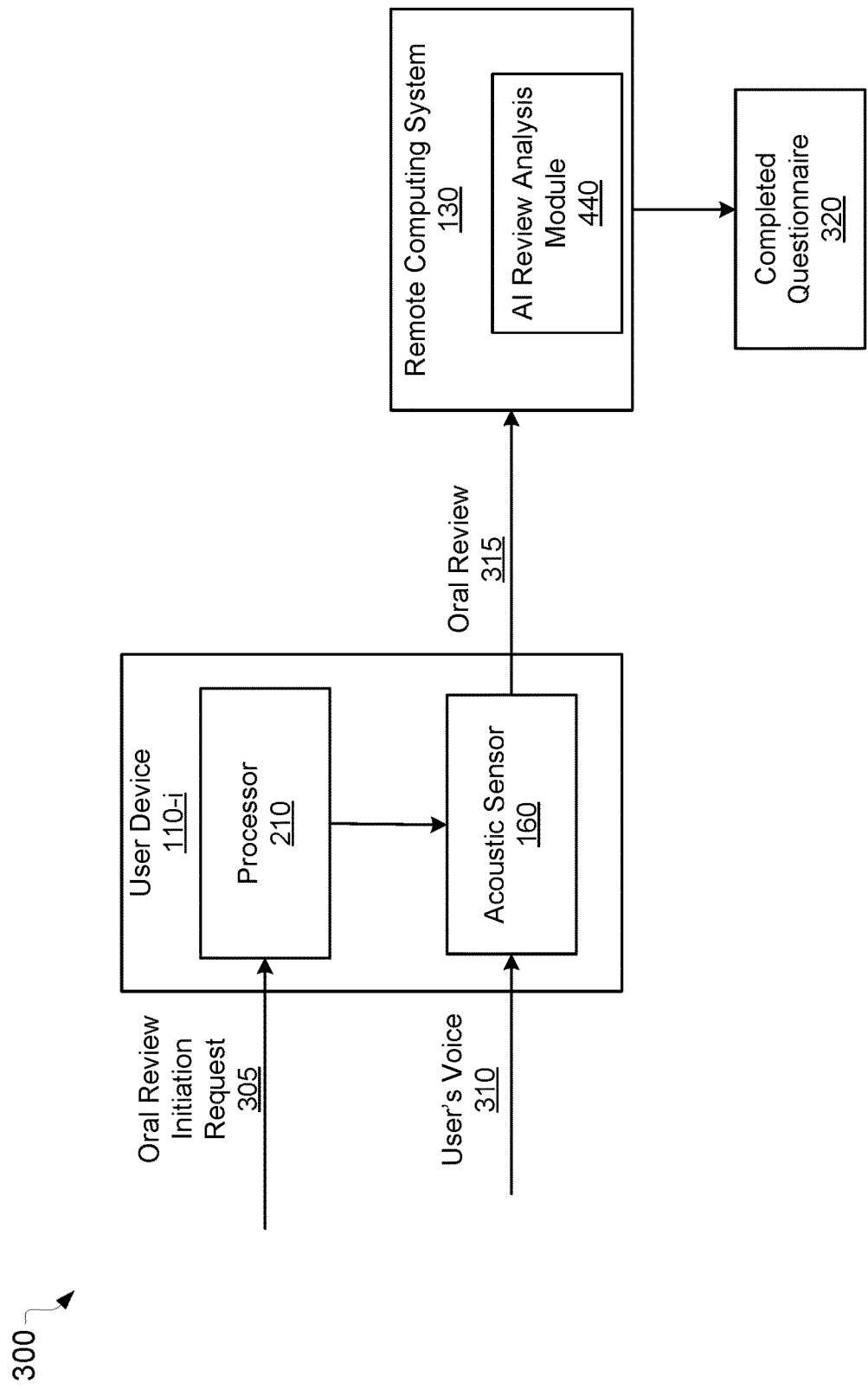
FIG. 3 is a block diagram illustrating an example communication between a user device and a remote computing system for collecting and analyzing oral reviews, according to an example embodiment.

FIG. 3 is a block diagram illustrating an example communication 300 between a user device 110-*i* and a remote computing system 130 for collecting and analyzing oral reviews, according to an example embodiment. The user device 110-*i* may receive an oral review initiation request 305 with a prompt to provide, via the user device 110-*i*, an oral review concerning a subject. The oral review may be initiated via one or more of the following: a link, a text message, a QR code printed on a product, a record button, a voice prompt, and so forth.

In response to receiving of the oral review initiation request 305, the processor 210 of the user device 110-*i* may provide, via the user device 110-*i*, the user with an interface configured to receive the oral review. After providing the interface to the user, the processor 210 may record, via the interface and the acoustic sensor 160, a user's voice 310. The user's voice 310 may include an oral review 315 provided by the user in respect of the subject. The user may provide the oral review 315 in a free format, for example, may use any words, any sentence structure, and the like.

The user device 110-*i* may send the oral review 315 to the remote computing system 130 for further processing. The remote computing system 130 may have an AI review analysis module 440 configured to analyze the oral review 315 and generate a structured review report concerning the subject based on the analysis. In an example embodiment, the structured review report may be provided in a form of a completed questionnaire 320 to a client that requested to conduct the review related to the subject.

Figure 4:
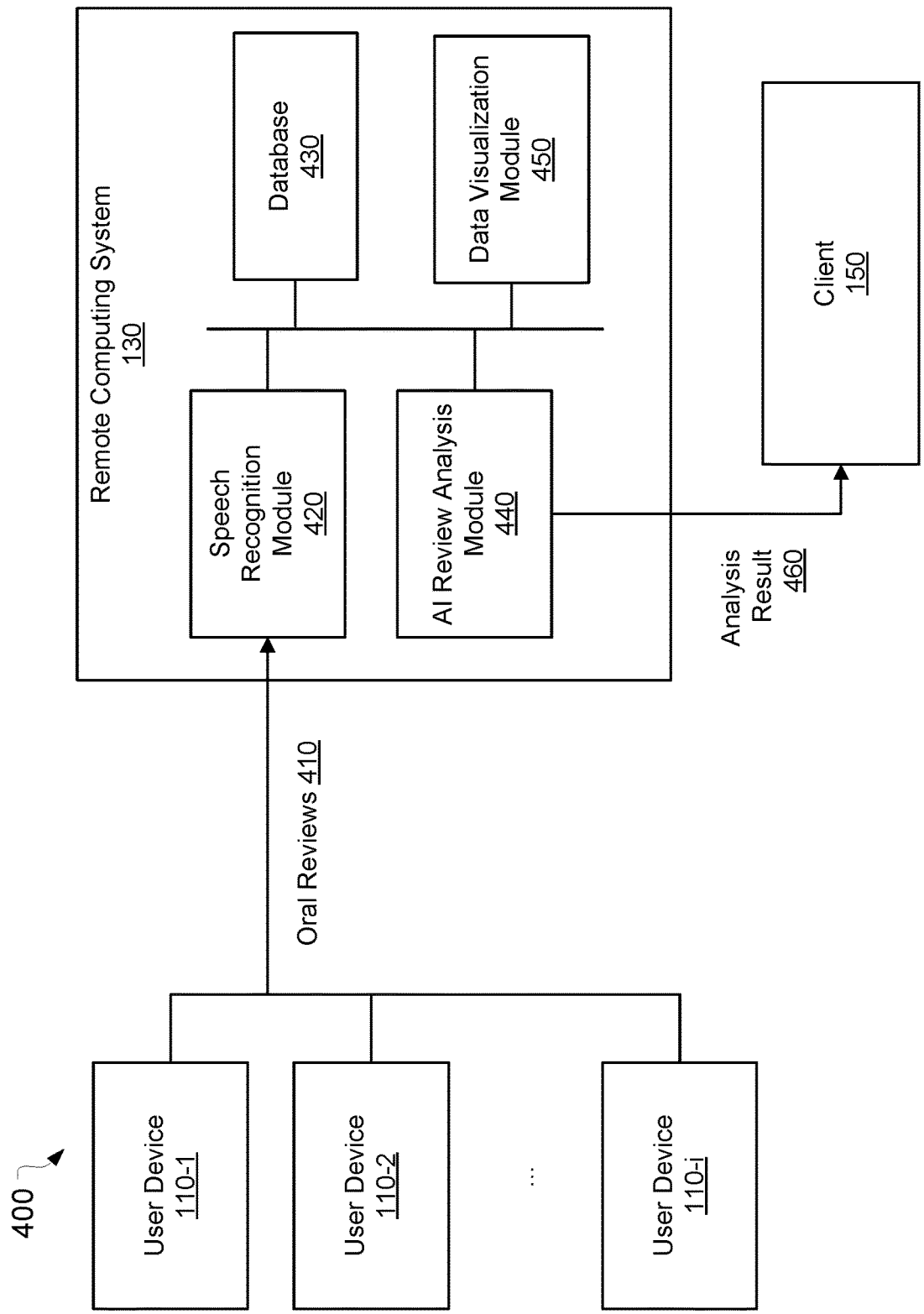
FIG. 4 is a block diagram illustrating an example system for AI-based analysis of oral reviews, according to an example embodiment.

FIG. 4 is a block diagram showing a system 400 for AI-based analysis of oral reviews, according to some example embodiments. The system 400 may include one or more user devices 110-*i* and a remote computing system 130. Each of user devices 110-*i* may have a processor 210 as shown in FIG. 2 and an acoustic sensor 160 as shown in FIG. 1. A plurality of user devices 110-*i* may be in communication with the remote computing system 130. The remote computing system 130 may include a speech recognition module 420, a database 430, an AI review analysis module 440, and a data visualization module 450.

In certain embodiments, the modules 420, 430, 440, and 450 can be implemented as instructions stored in a memory and executed by one or more processor(s) associated with the remote computing system 130.

A client 150 may request the remote computing system 130 to conduct a review related to a subject. The subject may be related to a product associated with a manufacturer of the product, a service associated with a provider of the service, and the like. In example embodiments, the subject may include one of a product, a service, a policy, and the like.

The remote computing system 130 may send, to the plurality of user devices 110-i, a prompt to provide, via the user device 110-i, an oral review concerning a subject. The prompt may be sent by the remote computing system 130 to multiple users at the same time or sequentially within a predetermined period of time.

The processors of the user device 110-i may receive a prompt from the remote computing system 130 in a form of a link, a text message, a QR code printed on a product, a record button, and a voice prompt, a portion of content, an advertising message, and so forth. In an example embodiment, the user may be prompted to provide the oral review during an advertising message, which may be played, for example, in a video or audio content.

The processors may prompt users of user devices 110-i to provide, via the user devices 110-i, an oral review 410 concerning the subject. The prompt may include presenting a link to the user, playing a message to the user, showing a portion of the content to the user, and so forth. The users may decide to provide the oral review 410 and respond to the prompt, e.g., by clicking on the link or message. In response to the click, the processors may provide, via the user devices 110-i, the users with an interface configured to receive the oral review.

Upon determining that the user has accessed the interface, an acoustic sensor (e.g., a microphone) of the user device 110-i may be activated. The interface may prompt the user to provide the oral review concerning the subject in a free format. In an example embodiment, the interface may present a record button to the user. The user may click on the record button and speak about the subject for a predetermined time. The user device 110-i may record the ambient acoustic signal after the user presses the record button.

In another example embodiment, upon determining that the user has accessed the interface, the processor of the user device 110-i may monitor, via the acoustic sensor, an ambient acoustic signal to detect the presence of the voice of the user. If the voice is detected, the processor may record, via the acoustic sensor, the ambient acoustic signal for a predetermined time to obtain the oral review in a free format.

Thus, the processor of the user device 110-i may receive, via the interface and the acoustic sensor, the oral review 410 concerning the subject in a free format. The user device 110-i may send the oral review 410 to the remote computing system 130. The speech recognition module 410 may parse the oral review 410 to convert the oral review 410 into text reviews. The speech recognition module 410 may recognize the portion of the ambient acoustic signal based on the vocabulary stored in the database 430. In response to the recognition of the portion of the ambient acoustic signal, the speech recognition module 420 may generate text and provide the text to the AI review analysis module 440.

Upon parsing, the oral review converted into the text review is analyzed by the AI review analysis module 440 using the AI. The analysis may include determining key parameters associated with the subject. Based on the key parameters, the data visualization module 450 may generate a structured review report concerning the subject.

The remote computing system 130 may receive a plurality of further oral reviews concerning the subject from other user devices 110-i associated with the plurality of users. The AI review analysis module 440 may analyze the plurality of further oral reviews using the AI to determine a set of common parameters associated with the subject. Based on the set of common parameters, the data visualization module 450 may generate an aggregated review report for the plurality of users based on a plurality of structured review reports associated with the users.

In an example embodiment, the AI review analysis module 440 may detect presence of voice of a user in the ambient acoustic signal received in oral review 410. The AI review analysis module 440 may also detect the presence of words or phrases in the voice of the user. In an example embodiment, the AI review analysis module 440 may analyze the ambient acoustic signal using machine learning algorithms to detect words or phrases in the oral review. The AI review analysis module 440 may be configured to determine which words are relevant to the subject and which words are irrelevant to the subject. For example, words relating to a room size, breakfast, and the like may be determined as relevant to the subject. In the phrase, "My wife and I had a good rest," the word "wife" may be determined to be irrelevant to the subject because the wife is part of user experience but is not relevant to the hotel. Relevant words may be determined to be the key parameters associated with the subject.

If a word or a phrase is found in a predetermined number of oral reviews 410, the AI review analysis module 440 may determine the word or the phrase to be a common parameter of the oral reviews 410.

The analysis may further include breaking down a user speech of the oral review 410 by parameters, determining the key parameters related to the subject, detecting keywords in the user speech, and scoring the key parameters based on the keywords. The keywords may be scored based on one or more of the following: a tone, a volume, a speed, a background noise, an emotional level of the user's voice, and so forth.

The AI review analysis module 440 may be configured to generate analytical data associated with the oral reviews 410 and determine statistics results associated with the oral reviews 410. The remote computing system 130 may be configured to provide analysis results 460 to the client 150 in form of the aggregated review report or the structured review report. The aggregated review report and the structured review report may include a data visualization. The data visualization may include a graph, a diagram, a spreadsheet, and the like built by the AI review analysis module 440 based on the analysis of the oral reviews 410.

In an example embodiment, the aggregated review report or the structured review report may include a completed questionnaire. The completed questionnaire may include the common parameters associated with the subject and found in the oral reviews 410 and rates assigned to the common parameters by the users in the oral reviews 410.

For example, even though the users were not asked specific questions, a predetermined number of users in their oral reviews may rate the room size as "sufficient," "OK," or "good", rate the cleanness in a room as "fine," "clean," or "sterile," and rate the breakfast as "bad," "small," or "not great." The AI review analysis module 440 may determine that the room size, the cleanness, and the breakfast are key parameters in each oral review and are common parameters in multiple oral reviews. The AI review analysis module 440 may analyze and score the keywords "sufficient," "OK," and "good" based on predetermined criteria and determine that these keywords correspond to 7 on a scale from 1 to 10. The AI review analysis module 440 may analyze and score the keywords "fine," "clean," and "sterile" based on predetermined criteria and determine that these keywords correspond to 10 on a scale from 1 to 10. The AI review analysis module 440 may further analyze and score the keywords "bad," "small," and "not great" based on predetermined criteria and determine that these keywords correspond to 4 on a scale from 1 to 10. The completed questionnaire provided to the client may include common parameters and their corresponding rates, for example, "room size"—7, "cleanness"—10, and "breakfast"—4.

In an example embodiment, the remote computing system 130 may be further configured to detect one or more stand-out parameters in the set of common parameters. The one or more stand-out parameters may include key parameters that exceed one or more threshold values. Based on the determination of the one or more stand-out parameters, the remote computing system 130 may issue an alert concerning the one or more stand-out parameters and send the alert to the client 150. For example, the AI review analysis module 440 may determine that a predetermined number of oral reviews 410 includes key parameters "bed" and "uncomfortable." The AI review analysis module 440 may determine that these key parameters exceed a threshold value. The alert concerning the one or more stand-out parameters may include, for example, an indication that "50% of users rate the bed as uncomfortable." Therefore, if a key parameter repeats or exceeds a threshold in oral reviews of multiple users (e.g., the majority of users said "Breakfast was bad"), this key parameter is emphasized in the review results provided to the client 150 to notify the client 150 that this key parameter needs attention of the client 150.

In an example embodiment, the analysis of the oral review may include determining demographics associated with the user. The demographics may be determined based on the analysis of the voice (e.g., a gender, an age), analysis of metadata associated with the user device 110-*i* (e.g., a phone model, a location), and data received from third parties (e.g., statistics or demographics for a specific location). In some embodiments, the user can be identified based on a unique link sent to the user with an invitation to provide the oral review. The system may also use the metadata of the user device to determine that the user is a known user that communicated with the system in the past. The analysis may further include grouping users into clusters based on predetermined parameters (e.g., a location, an age, and a time of shopping), determining common key parameters for clusters of users, and so forth.

FIG. 5 is a flow chart showing a method 500 for AI-based analysis of oral reviews, according to an example embodiment. The method 500 can be implemented by using the system 400 shown in FIG. 4. In some embodiments, the operations of method 500 may be combined, performed in parallel, or performed in a different order. The method 500 may also include additional or fewer operations than those illustrated.

The method 500 may commence in block 505 with prompting, by a processor associated with a user device, a user to provide an oral review concerning a subject. The oral review may be initiated via one or more of the following: a link, a text message, a QR code printed on a product, a record button, a voice prompt, and so forth.

The method 500 may continue in block 510 with providing, by the processor associated with the user device, the user with an interface configured to receive the oral review. The method 500 may continue in block 515 with receiving, by the processor via the interface, the oral review concerning the subject in a free format.

The method 500 may continue in block 520 with analyzing, by the remote computing system, the oral review with the AI to determine key parameters associated with the subject. The analysis of the oral review may include determining demographics associated with the user. The analysis may further include breaking down the user speech by parameters, determining the key parameters related to the subject, detecting keywords in the user speech, and scoring the key parameters based on the keywords. The method 500 may continue in block 525 with generating, by the remote computing system and based on the key parameters, a structured review report concerning the subject.

The method 500 may further include receiving a plurality of further oral reviews concerning the subject from a plurality of users. The plurality of further oral reviews can be analyzed using the AI to determine a set of common parameters associated with the subject. An aggregated review report for the plurality of users can be generated based on the set of common parameters. The method 500 may further include providing the aggregated review report to a client.

The method 500 may further include detecting one or more stand-out parameters in the set of common parameters. The one or more stand-out parameters may include key parameters that exceed one or more threshold values. The method 500 may further include issuing an alert concerning the one or more stand-out parameters and sending the alert to the client.

Figure 6:
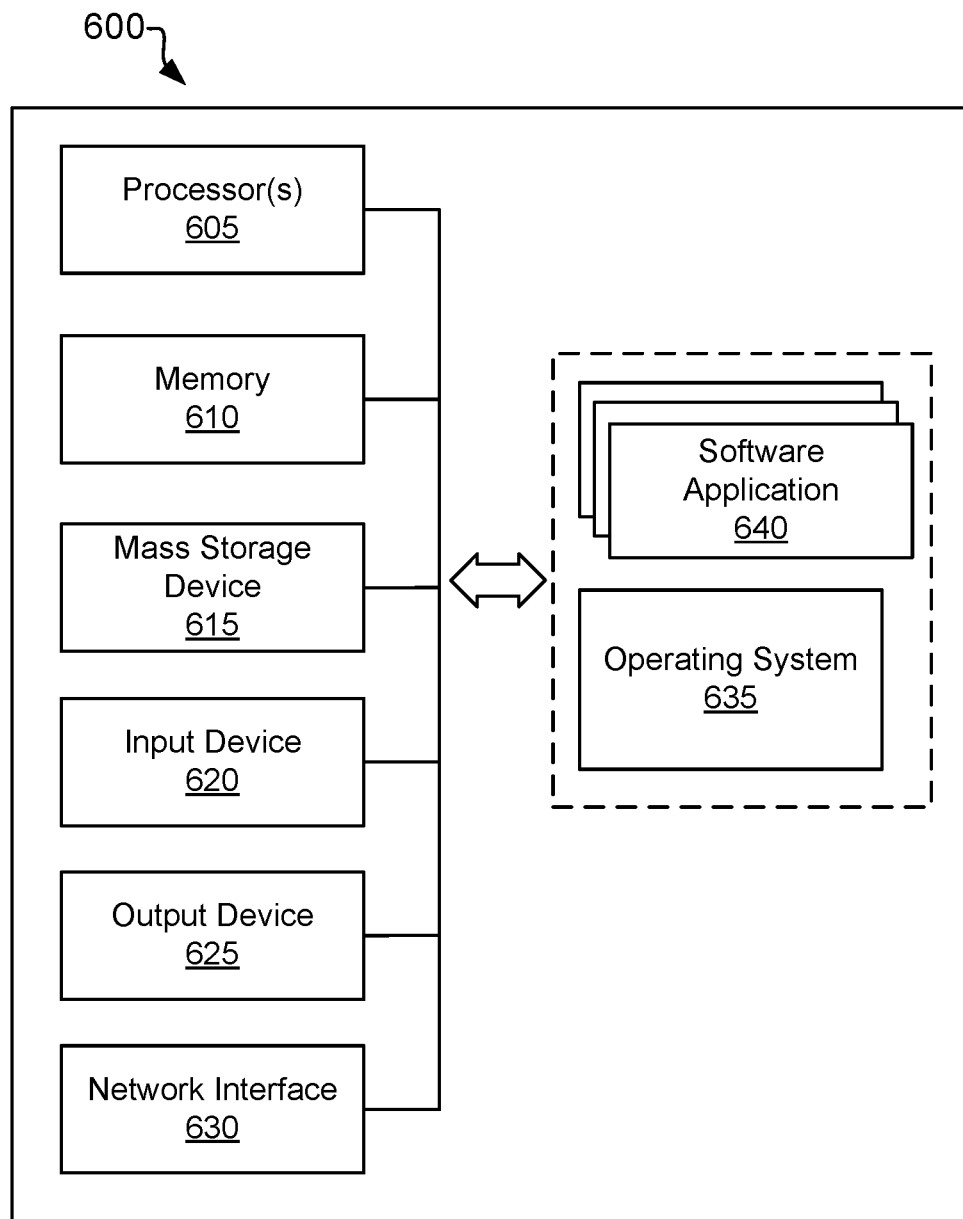
FIG. 6 is a high-level block diagram illustrating an example computer system, within which a set of instructions for causing the machine to perform any one or more of the methodologies discussed herein can be executed.

FIG. 6 is a high-level block diagram illustrating an example computer system 600, within which a set of instructions for causing the machine to perform any one or more of the methodologies discussed herein can be executed. The computer system 600 may include, refer to, or be an integral part of, one or more of a variety of types of devices, such as a general-purpose computer, desktop computer, laptop computer, tablet computer, netbook, mobile phone, smartphone, personal digital computer, smart TV device, and server, among others. In some embodiments, the computer system 600 is an example of user device(s) 110-*i* or remote computer system 130. Notably, FIG. 6 illustrates just one example of the computer system 600 and, in some embodiments, the computer system 600 may have fewer elements/modules than shown on FIG. 6 or more elements/modules than shown on FIG. 6.

The computer system 600 includes one or more processors 605, a memory 610, one or more mass storage devices 615, one or more input devices 620, one or more output devices 625, and network interface 630. One or more processors 605 are, in some examples, configured to implement functionality and/or process instructions for execution within the computer system 600. For example, the processors 605 may process instructions stored in memory 610 and/or instructions stored on mass storage devices 615. Such instructions may include components of an operating system 635 or software applications 640. The computer system 600 may also include one or more additional components not shown in FIG. 6, such as a housing, power supply, battery, global positioning system (GPS) receiver, and so forth.

Memory 610, according to one example, is configured to store information within the computer system 600 during operation. Memory 610, in some example embodiments, may refer to a non-transitory computer-readable storage medium or a computer-readable storage device. In some examples, memory 610 is a temporary memory, meaning that a primary purpose of memory 610 may not be long-term storage. Memory 610 may also refer to a volatile memory, meaning that memory 610 does not maintain stored contents when memory 610 is not receiving power. Examples of volatile memories include random access memories (RAM), dynamic random access memories (DRAM), static random access memories (SRAM), and other forms of volatile memories known in the art. In some examples, memory 610 is used to store program instructions for execution by the processors 605. Memory 610, in one example, is used by software (e.g., the operating system 635 or software applications 640). Generally, software applications 640 refer to software applications suitable for implementing at least some operations of the methods for providing a location-based gaming experience as described herein.

One or more mass storage devices 615 can also include one or more transitory or non-transitory computer-readable storage media and/or computer-readable storage devices. In some embodiments, mass storage devices 615 may be configured to store greater amounts of information than memory 610. Mass storage devices 615 may further be configured for long-term storage of information. In some examples, the mass storage devices 615 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

Still referencing to FIG. 6, the computer system 600 may also include one or more input devices 620. The input devices 620 may be configured to receive input from a user through tactile, audio, video, or biometric channels. Examples of input devices 620 may include a keyboard, keypad, mouse, trackball, touchscreen, touchpad, microphone, one or more video cameras, image sensors, fingerprint sensors, or any other device capable of detecting an input from a user or other source, and relaying the input to the computer system 600, or components thereof.

The output devices 625, in some examples, may be configured to provide output to a user through visual or auditory channels. Output devices 625 may include a video graphics adapter card, a liquid crystal display (LCD) monitor, a light emitting diode (LED) monitor, an organic LED monitor, a sound card, a speaker, a lighting device, a LED, a projector, or any other device capable of generating output that may be intelligible to a user. Output devices 625 may also include a touchscreen, presence-sensitive display, or other input/output capable displays known in the art.

The computer system 600, in some example embodiments, also includes network interface 630. The network interface 630 can be utilized to communicate with external devices via one or more data networks such as one or more wired, wireless, or optical networks including, for example, the Internet, intranet, LAN, WAN, cellular phone networks, Bluetooth radio, and an IEEE 902.11-based radio frequency network, among others. The network interface 630 may be a network interface card, such as an Ethernet card, an optical transceiver, a radio frequency transceiver, or any other type of device that can send and receive information.

The operating system 635 may control one or more functionalities of the computer system 600 and/or components thereof. For example, the operating system 635 may interact with the software applications 640 and may facilitate one or more interactions between the software applications 640 and components of the computer system 600. As shown in FIG. 6, the operating system 635 may interact with or be otherwise coupled to the software applications 640 and components thereof. In some embodiments, software applications 640 may be included in operating system 635. In these and other examples, virtual modules, firmware, or software may be part of the software applications 640.

According to another example embodiment of the present disclosure, the system for AI-based analysis of oral reviews may be used to analyze an oral review received from a user in a free format and convert the oral review into a text for review in a predetermined format. The conversion may be performed by converting the free-format oral review into intermediate text and restructuring the intermediate text into the text for review. In the course of the restructuring, filler words may be identified and removed from the intermediate text. Furthermore, the intermediate text may be converted from the free format to a predetermined format according to grammar rules and punctuation rules of a natural (human) language.

More specifically, the system may use a user device to prompt a user to provide an oral review concerning a subject. For example, the prompt may be provided in a form of a link in an e-mail or text message, in a QR code, in an advertising message provided in a video or audio content to the user, and so forth. The user may response to the prompt (e.g., select the link or scan the QR code) to initiate the oral review. In response to the selection of the link or scanning the QR code, the system may provide, via the user device, a user interface configured to receive the oral review. Upon determining that the user has accessed the user interface, an acoustic sensor (e.g., a microphone) of the user device may be activated. The user interface may prompt the user to provide the oral review concerning the subject in a free format. In an example embodiment, the user interface may display a record button. The user may click on the record button and talk about the subject (i.e., provide user feedback in a free format) for a predetermined time. After the user presses the record button, the user device may record the ambient acoustic signal of the oral review. In the oral review, the user may describe their experience of interacting with the subject, advantages and disadvantages of the subject, and provide any other information the user finds relevant with respect to the subject.

In another example embodiment, upon determining that the user has entered the user interface, a processor of the user device may monitor, via the acoustic sensor, an ambient acoustic signal to detect the presence of the voice of the user. If the voice is detected, the processor may record, via the acoustic sensor, the ambient acoustic signal for a predetermined time to obtain the oral review in a free format.

Upon recording the ambient acoustic signal, the user device may provide the ambient acoustic signal containing the oral review to a remote computing system. The remote computing system may analyze the oral review using the AI. Specifically, the remote computing system may perform speech recognition of the recorded ambient acoustic signal to obtain an intermediate text and analyze the intermediate text. The remote computing system may further analyze the tone, speed, volume of the user voice, an emotional state of the user, the amount of the intermediate text, the duration of the oral review, the number of details provided by the user with respect to the subject, and so forth.

Based on the analysis of the intermediate text, the remote computing system may process the intermediate text. In an example embodiment, the processing may include removing the filler words from the intermediate text and restructuring the intermediate text based on predetermined grammar rules or any other rules of the human language. Upon processing of the intermediate text, the remote computing system may generate the text for review based on the processed intermediate text.

The remote computing system may provide the text for review to the user device for presenting the text for review by the user device to the user. Upon presenting the text for review to the user, the user device may provide the user with an option to publish the text for review via at least one social media.

FIG. 7 is a block diagram illustrating an example communication 700 between a user device 110-i and a remote computing system 130 for analyzing oral reviews, according to an example embodiment. The user device 110-i may receive an oral review initiation request 305 with a prompt to provide, via the user device 110-i, an oral review concerning a subject. The subject may include one of the following: a product, a service, a policy, and so forth. The oral review may be initiated via one or more of the following: a link, a text message, a QR code printed on a product, a record button, a voice prompt, and so forth.

In response to receiving of the oral review initiation request 305, the processor 210 of the user device 110-i may provide, via the user device 110-i, the user with an interface configured to receive the oral review. After providing the interface to the user, the processor 210 may record, via the interface and the acoustic sensor 160 of the user device 110-i, a user's voice 310. The user's voice 310 may include an oral review 315 provided by the user in respect of the subject. The user may provide the oral review 315 in a free format (for example, may use any words, any sentence structure, and the like).

The user device 110-i may send the oral review 315 to the remote computing system 130 for further processing. The remote computing system 130 may have an AI review analysis module 440 configured to analyze the oral review 315 and generate a text for review 710 concerning the subject based on the analysis.

Usually, a spoken language differs from a written language because, when a person speaks, a person constructs sentences differently than in the written language. The spoken language may include filler words (e.g., crutch words), repetitions, pauses, reinterpretations of previously pronounced words, and so forth. Moreover, the speech of the person may be slurred, unarticulated, colloquial, or otherwise differing from a commonly accepted written language. Furthermore, the intonation with which the person pronounces the phrase may function as an additional layer of meaning of the phrase.

The AI review analysis module 440 may analyze the oral review 315 based on predetermined parameters and transform the oral review 315 into the written text for review 710. Specifically, the text for review 710 may be generated based on rewriting and restructuring the oral review 315 based on predetermined rules. More specifically, the generation of the text for review 710 based on the oral review 315 may include generating, based on the oral review 315, an intermediate text matching words that the user has uttered during the oral review. The generation of the text for review 710 may further include analyzing the intermediate text to generate the text for review 710. The analysis may include processing the intermediate text by removing filler words from the intermediate text, removing predetermined words from the intermediate text, converting the intermediate text from the free format to a format according to grammar rules and/or syntax rules of at least one human language, reordering or regrouping words based on a meaning of the words provided by an intonation in the oral review 315, reordering or regrouping words based on semantic emphasis given to some words in the oral review 315, and so forth. Thus, the AI review analysis module 440 may transcribe the oral review 315, which may be slurred or unarticulated, and rewrite the transcribed text into a literate and harmonious text for review 710 while preserving the meaning (i.e., the idea) expressed by the user in the oral review 315.

The text for review 710 may be presented to the user using the user device 110-i. Upon presenting the text for review 710 to the user, the user may be provided with an option 715 to publish the text for review 710 via at least one social media. The at least one social media may include one or more of the following: Google Maps™, Yelp™, and so forth.

In some embodiments, upon presenting the text for review 710 to the user, the user may be provided with an option 720 to contact a client 150, such as a service provider or a product provider associated with the subject. The processor 210 may also present information allowing the user to contact the service provider or the product provider.

In an example embodiment, the remote computing system 130 may analyze the oral review 315 with the AI review analysis module 440 to determine that the user has expressed a positive opinion regarding the subject. The analysis may include one or more of the following: determining, based on the voice of the user, that an emotional state of the user is positive; determining that the user has uttered one or more of predetermined keywords; and the like. If the user has expressed a positive opinion regarding the subject, the option 715 to publish the text for review 710 via the at least one social media is provided to the user.

In a further example embodiment, the remote computing system 130 may analyze the oral review 315 with the AI review analysis module 440 to determine that the user has expressed a negative opinion 725 regarding the subject. In response to the determination that the user has expressed the negative opinion 725, a report concerning the negative opinion 725 may be provided to the client 150. In some embodiments, in response to receiving the report concerning the negative opinion 725, the client 150 may contact the user and propose solving the problem or helping the user with issues that caused the negative opinion 725.

In a further example embodiment, the remote computing system 130 may analyze the oral review 315 with the AI review analysis module 440 to determine that the oral review includes an irrelevant message. The determination that the oral review includes the irrelevant message may include determining that the oral review 315 includes more than a predetermined number of keywords irrelevant to the subject. In some embodiments, the determination that the oral review 315 includes the irrelevant message may include determining that a length of the oral review 315 is longer than a predetermined length. For example, a duration of the oral review 315 may be longer than a predetermined duration or a number of words in the oral review 315 may be greater than a predetermined number of words. In response to the determination that the oral review includes the irrelevant message includes, a notification 730 notifying the client 150 of the irrelevant message may be provided to the client 150.

In an example embodiment, the irrelevant message may include a potential fraud and the system of the present disclosure may be used for detection of the potential fraud based on analysis of the oral speech of users. More specifically, a user may call or provide an audio message to a third party (e.g., an insurance company) and report an insurance event. The call may be recorded for further analysis. The recorded oral speech of the call or the audio message may be analyzed based on predetermined parameters to determine whether the report is a potential fraud. In general, when people provide untruthful information, they usually tend to provide irrelevant details, some facts in their speech may contradicts each other, the length of the speech may be longer than a length of historic legitimate reports, the speed of the speech may differ from the speed of historic legitimate reports, the tone or other parameters of the voice may be different from those of historic legitimate reports, and so forth. All these and any other predetermined parameters may be analyzed in the course of the analysis of the oral speech for the presence of the potential fraud. If it is determined, based on the analysis, that the report of the user is the potential fraud, a notification may be provided to the third party. For example, the notification flagging the report of the user as "potential fraud" may be provided to the third party.

Thus, the system of the present disclosure may simplify the process of providing reviews by users because users may provide their reviews orally and do not need to type the reviews manually. The system transforms the oral reviews into grammatically correct and structured text for reviews, so users do not need to worry whether their reviews are clear or grammatically correct.

FIG. 8 is a flow chart showing a method 800 for AI-based analysis of oral reviews, according to an example embodiment. The method 800 can be implemented by using the system 400 shown in FIG. 4. In some embodiments, the operations of method 800 may be combined, performed in parallel, or performed in a different order. The method 800 may also include additional or fewer operations than those illustrated.

The method 800 may commence in block 805 with prompting, by a processor associated with a user device, a user to provide an oral review concerning a subject. The oral review may be initiated via one or more of the following: a link, a text message, a QR code printed on a product, a record button, a voice prompt, and so forth. The subject may include one of the following: a product, a service, a policy, and so forth.

The method 800 may continue in block 810 with providing, by the processor associated with the user device, the user with an interface configured to receive the oral review. The method 800 may continue in block 815 with receiving, by the processor via the interface, the oral review concerning the subject in a free format.

The method 800 may continue in block 820 with generating, by the remote computing system, based on the oral review, a text for review. The generation of the text for review based on the oral review may include generating, based on the oral review, an intermediate text that matches words that the user has uttered during the oral review. The generation of the text for review may further include analyzing the intermediate text to generate the text for review. In an example embodiment, the analysis of the intermediate text may include removing filler words from the intermediate text, converting the intermediate text from the free format to a predetermined format according to grammar rules or any other rules of at least one human language, and so forth.

In an example embodiment, the oral review may be analyzed with the AI to determine that the user has expressed a positive opinion regarding the subject. The analysis may include determining, based on the voice of the user, that an emotional state of the user is positive. In some embodiments, the analysis may include determining that the user has uttered one or more of predetermined keywords.

The method 800 may continue in block 825 with presenting the text for review to the user. The user may read the text for review to make sure that the meaning of the text for review corresponds to the meaning of the oral review provided by the user. In some embodiments, the user may be provided with an option to correct, revise, rewrite, or otherwise change the text for review. The method 800 may further include providing to the user, in block 830, an option to publish the text for review via at least one social media. The at least one social media may include one or more of the following: Google Maps™, Yelp™, and so forth. In an example embodiment, the option to publish the text for review is provided to the user when it is determined that the user has expressed a positive opinion in the oral review.

FIG. 9 is a flow chart showing a method 900 for AI-based analysis of oral reviews, according to an example embodiment. In some embodiments, the method 900 may be a continuation of the method 800 shown in FIG. 8.

The method 900 may include analyzing, in block 905, the oral review with the AI to determine that the user has expressed a negative opinion regarding the subject. The analysis may include determining, based on the voice of the user, that an emotional state of the user is negative. In some embodiments, the analysis may include determining that the user has uttered one or more of predetermined keywords.

The method 900 may continue in block 910 with sending a report concerning the negative opinion to a service provider or a product provider. The report may be sent in response to the determination that the user has expressed a negative opinion regarding the subject. The method 900 may optionally continue in block 915 with presenting information allowing the user to contact the service provider or the product provider.

FIG. 10 is a flow chart showing a method 1000 for AI-based analysis of oral reviews, according to an example embodiment. In some embodiments, the method 1000 may be a continuation of the method 800 shown in FIG. 8.

The method 1000 may include analyzing, in block 1005, the oral review with the AI to determine that the oral review includes an irrelevant message. The determination that the oral review includes the irrelevant message may include determining that the oral review includes more than a predetermined number of keywords irrelevant to the subject. In some embodiments, the determination that the oral review includes the irrelevant message may include determining that a length of the oral review is longer than a predetermined length.

The method 1000 may continue in block 1010 with notifying a service provider or a product provider of the irrelevant message. The notifying may be performed in response to the determination that the oral review includes an irrelevant message.

Thus, systems and methods for AI-based analysis of oral reviews have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for Artificial Intelligence (AI)-based analysis of oral reviews, the method comprising:

prompting a user to provide an oral review concerning a subject;
providing the user with an interface configured to receive the oral review;
upon providing the interface, activating an acoustic sensor associated with a user device, the user device being associated with the user;
upon the activation of the acoustic sensor, analyzing an ambient acoustic signal to detect presence of a voice of the user;
in response to the detection, recording, via the acoustic sensor, the ambient acoustic signal to receive, via the interface, the oral review concerning the subject in a free format;
generating, based on the oral review, a text for review;
presenting the text for review to the user;
providing, to the user, an option to publish the text for review via at least one social media;
determining that the oral review includes more than a predetermined number of keywords inconsistent with the subject; and
notifying a service provider or a product provider that the oral review includes a message inconsistent with the subject.

2. The method of claim 1, further comprising analyzing the oral review with the AI to determine that the user has expressed a positive opinion regarding the subject, wherein the determining includes one of the following:
determining, based on the voice of the user, that an emotional state of the user is positive; and
determining that the user has uttered one or more of predetermined keywords.

3. The method of claim 1, wherein the generating, based on the oral review, the text for review includes:
generating, based on the oral review, an intermediate text matching words that the user has uttered during the oral review; and
analyzing the intermediate text to generate the text for review.

4. The method of claim 3, wherein the analyzing the intermediate text includes one or more of the following:
removing filler words from the intermediate text; and
converting the intermediate text from the free format to a format according to a grammar rule of at least one human language.

5. The method of claim 1, further comprising:
analyzing the oral review with the AI to determine that the user has expressed a negative opinion regarding the subject; and
in response to the determination, sending a report concerning the negative opinion to the service provider or the product provider.

6. The method of claim 5, further comprising presenting information to facilitate the user to contact the service provider or the product provider.

7. The method of claim 1, further comprising:
analyzing the oral review with the AI based on predetermined parameters to determine that the oral review includes a fraudulent message, wherein the analyzing includes determining that the oral review includes a first part and a second part contradicting to the first part;
in response to the determination, notifying the service provider or the product provider of the fraudulent message.

8. The method of claim 7, wherein the determination that the oral review includes the fraudulent message includes determining, based on a speech of the user, that a speed of the speech differs from a predetermined speed.

9. The method of claim 1, wherein:
the subject includes one of the following: a product, a service, and a policy; and
the oral review is initiated via one or more of the following: a link, a text message, a Quick Response (QR) code printed on the product, and a voice prompt.

10. A system for Artificial Intelligence (AI)-based analysis of oral reviews, the system comprising:
a processor; and
a memory storing instructions that, when executed by the processor, configure the processor to:
prompt a user to provide an oral review concerning a subject;
provide the user with an interface configured to receive the oral review;
upon providing the interface, activate an acoustic sensor associated with a user device, the user device being associated with the user;
upon the activation of the acoustic sensor, analyze an ambient acoustic signal to detect presence of a voice of the user;
in response to the detection, record, via the acoustic sensor, the ambient acoustic signal to receive, via the interface, the oral review concerning the subject in a free format;
generate, based on the oral review, a text for review;
present the text for review to the user;
provide, to the user, an option to publish the text for review via at least one social media;
determine that the oral review includes more than a predetermined number of keywords inconsistent with the subject; and
notify a service provider or a product provider that the oral review includes a message inconsistent with the subject.

11. The system of claim 10, wherein the processor is further configured to analyze the oral review with the AI to determine that the user has expressed a positive opinion regarding the subject, wherein the determining includes one of the following:
determining, based on the voice of the user, that an emotional state of the user is positive; and
determining that the user has uttered one or more of predetermined keywords.

12. The system of claim 10, wherein the generating, based on the oral review, the text for review includes:
generating, based on the oral review, an intermediate text matching words that the user has uttered during the oral review; and
analyzing the intermediate text to generate the text for review.

13. The system of claim 12, wherein the analyzing the intermediate text includes one or more of the following:
removing filler words from the intermediate text; and
converting the intermediate text from the free format to a format according to a grammar rule of at least one human language.

14. The system of claim 10, wherein the processor is further configured to:
analyze the oral review with the AI to determine that the user has expressed a negative opinion regarding the subject; and
in response to the determination, send a report concerning the negative opinion to the service provider or the product provider.

15. The system of claim 14, wherein the processor is further configured to present information to facilitate the user to contact the service provider or the product provider.

16. The system of claim 10, wherein the processor is further configured to:
analyze the oral review with the AI based on predetermined parameters to determine that the oral review includes a fraudulent message, wherein the analyzing includes determining that the oral review includes a first part and a second part contradicting to the first part;
in response to the determination, notify the service provider or the product provider of the fraudulent message.

17. The system of claim 16, wherein the determination that the oral review includes the fraudulent message includes determining, based on a speech of the user, that a speed of the speech differs from a predetermined speed.

18. A non-transitory computer-readable storage medium having instructions stored thereon, which, when executed by one or more processors, cause the one or more processors to:
prompt a user to provide an oral review concerning a subject;
provide the user with an interface configured to receive the oral review;
upon providing the interface, activate an acoustic sensor associated with a user device, the user device being associated with the user;
upon the activation of the acoustic sensor, analyze an ambient acoustic signal to detect presence of a voice of the user;
in response to the detection, record, via the acoustic sensor, the ambient acoustic signal to receive, via the interface, the oral review concerning the subject in a free format;
generate, based on the oral review, a text for review;
present the text for review to the user;
provide, to the user, an option to publish the text for review via at least one social media;
determine that the oral review includes more than a predetermined number of keywords inconsistent with the subject; and
notify a service provider or a product provider that the oral review includes a message inconsistent with the subject.

* * * * *